Aug. 27, 1957     J. H. HESTER     2,803,969
SAFETY LINKAGE FOR DUAL ACCELERATOR PEDALS
Filed Jan. 21, 1954
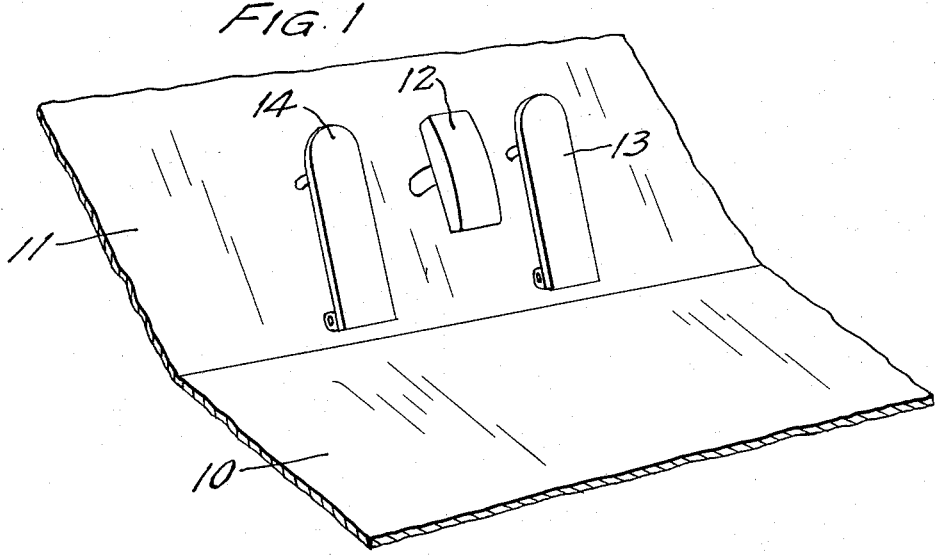
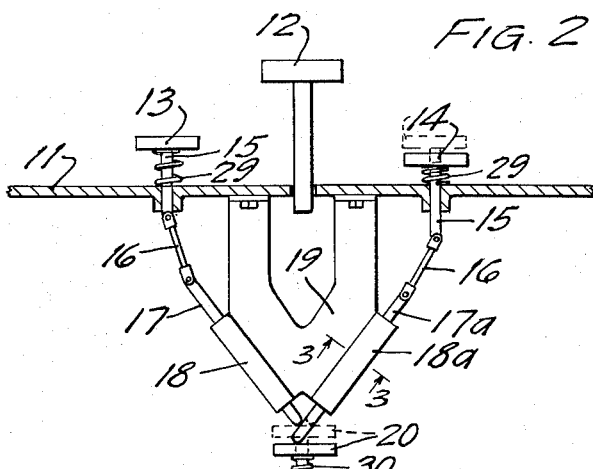
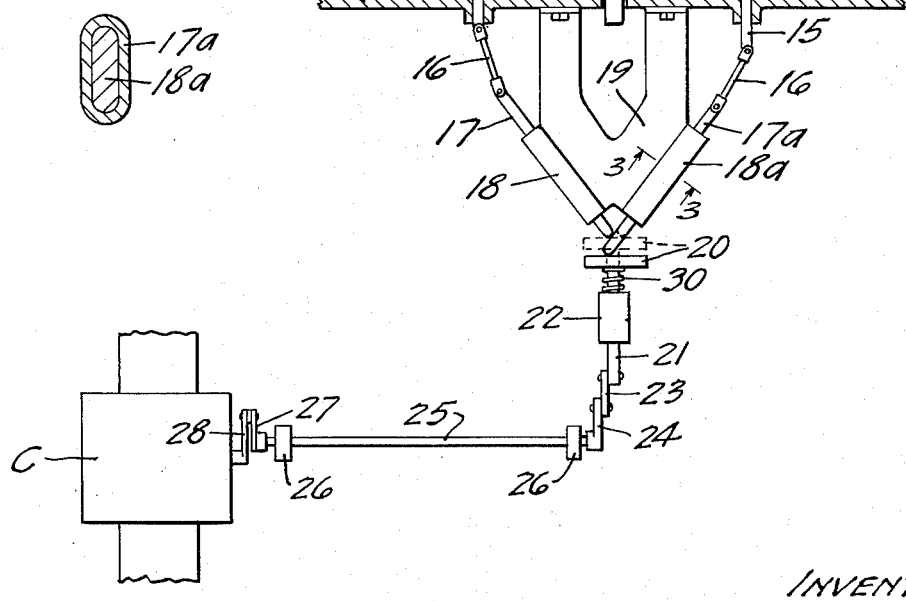
INVENTOR
BY JAMES H. HESTER
Williamson, Williamson, Schroeder & Adams
ATTORNEYS United States Patent Office 2,803,969
Patented Aug. 27, 1957

2,803,969
SAFETY LINKAGE FOR DUAL ACCELERATOR PEDALS

James H. Hester, Minneapolis, Minn.

Application January 21, 1954, Serial No. 405,289

4 Claims. (Cl. 74—478)

This invention relates to apparatus for use in an automobile with dual accelerator pedals, and more specifically this invention relates to mechanism for connecting the dual accelerator pedals to the fuel flow control means.

Dual accelerator pedals have been used in automobiles for many years. The principal advantage in having them is to allow the driver to rest one foot while he operates the accelerator with his other foot. For example, while the driver operates the left accelerator pedal with the corresponding foot, his right may be taken off the accelerator pedal to assume a comfortable position. This advantage is particularly desirable on long trips.

But oftentimes on these long trips, there may be children riding in the front seat with the driver. If they move around, as children often do, when the driver has his right foot removed from the accelerator pedal, one of the children is very apt to get his foot on the right pedal and press it down. Such inadvertent action on the part of the child could prove to be very dangerous and cause a serious accident because the driver would no longer have full control of the speeding automobile especially if traffic conditions are congested.

An object of my invention is to provide apparatus of inexpensive and simple construction and operation for improving the operation of dual accelerator pedals in automobiles.

Another object of my invention is to provide novel apparatus of valuable utility for use with dual accelerator pedals.

Still another object of my invention is to provide improved mechanism for connecting the fuel flow control means to dual accelerator pedals of an automobile.

A further object of my invention is to provide in an automobile having dual accelerator pedals, safety mechanism connecting them to the fuel flow control means which will render one of the pedals inoperative for fuel flow control while the other pedal is in operation.

These and other objects and advantages of my invention will more fully appear from the following description made in connection with the accompanying drawings wherein like reference characters refer to the same parts throughout the several views and in which:

Fig. 1 is a view of the floorboards and foot controls of an automobile;

Fig. 2 is a diagrammatic view of my apparatus;

Fig. 3 is a cross-sectional view taken at 3—3 in Fig. 2.

The embodiment of my invention shown in the figures includes the floorboards 10 and fire wall 11 of an automobile of the type without a clutch pedal. The brake pedal 12 extends through the fire wall 11 in its usual location. An accelerator pedal 13 is in its usual location adjacent the brake pedal and is pivotally mounted at its lower end for a swinging movement. A second accelerator pedal 14 is mounted to the left of the brake pedal 12 and in the position normally occupied by the clutch of an automobile. The accelerator pedal 14 is also pivotally mounted at its lower end for a swinging movement. The exact location of the accelerator pedal 14 is not critical and it could be shifted one way or another if the automobile has a clutch.

A rod 15 or appendage is affixed at one of its ends to the upper end of each accelerator pedal. The appendages 15 extend through the fire wall 11 of the automobile. Each of the appendages 15 is pivotally connected at their other end to a connecting link 16.

A pair of shiftable actuating elements 17 and 17a such as rigid rods are pivotally connected at their upper ends to the other end of the connecting links 16. Rods 17 and 17a are slidably supported, such as by bushings 18 and 18a, and they lie in a common plane. The lower ends of the rods 17 and 17a are adjacent, and the upper ends thereof are in spaced relation. When one of the rods is projected downwardly through the bushing by movement of the respective accelerator pedal, as shown in Figure 2, it will extend across the path of shifting of the other of the rods and thereby prevent the other rod from shifting. The bushings 18 and 18a are suitably mounted on the fire wall or frame of the automobile, such as by bracket 19.

I also provide a seat 20 which lies in a plane perpendicular to the plane in which the rods 17 and 17a lie and which is in close association with the lower ends of the rods so that, if one of the rods be projected downwardly, it will engage the seat 20. A shiftable rod 21 is affixed to the seat 20 and extends downwardly therefrom. The rod 21 is slidably supported such as by bushing 22. The seat is thereby adapted to cooperatively shift with projection of one of the rod members 17 or 17a. The bushing 22 is suitably supported on the frame of the automobile.

The rod member 21 is connected at its lower end to suitable linkage mechanism which transmits movement of the rod 21 to the throttle-opening control mechanism C or carburetor of the automobile.

Such suitable linkage mechanism interconnecting the rod 21 and the carburetor C comprises a link 23 which is pivotally connected at one of its ends to the rod 21 and similarly connected at its other end to a crank arm 24. The crank arm 24 is non-rotatably mounted on a rocker shaft 25. Rocker shaft 25 is suitably supported, such as by bushings 26, for rotation. A rocker arm 27 is non-rotatably mounted on the other end of the rocker shaft 25, and is pivotally connected to a throttle arm 28. The throttle arm 28 operates directly on the carburetor C to control the flow of fuel therethrough.

Compression springs 29 are mounted in surrounding relation with the appendages 15 and between the accelerator pedals and the fire wall. Springs 29 act to push the accelerator pedals away from the fire wall after they have been relieved of foot pressure. I also provide a compression spring 30 in surrounding relation with rod 21 and between the bushing 22 and seat 20. Spring 30 operates to move the seat upwardly when neither the rod members 17 or 17a are projecting the seat 20 downwardly.

If accelerator pedal 14 is depressed, the corresponding connecting link 16 and rod 17a will be shifted. Rod 17a will extend downwardly and will combinatively shift the seat 20 downwardly and will obstruct the shifting path of rod 17. The precluding of shifting of rod 17 precludes the accelerator pedal 13 from being depressed and therefore precludes operation of the carburetor C by means of accelerator pedal 13. When the seat 20 is shifted by the rod member 17a, rod 21 is shifted downwardly through the bushing 22 and causes the crank arm 24 to be turned about the axis of rocker shaft 25, causes rocker shaft 25 to turn, and causes the rocker arm 27 to turn, which operates on the carburetor to increase the fuel flow therethrough.

When the accelerator pedal 14 is released, spring 29 will cause the rod 17a to be retracted. When rod 17a releases seat 20, it will be forced upwardly by the spring 30. The rod 21 and the linkage connecting it to the carburetor will also shift with the upward movement of seat 20 to operate the carburetor and decrease the fuel flow therethrough.

It will be seen that I have provided apparatus of inexpensive and simple construction and operation for improving the operation of dual accelerator pedals in an automobile. My apparatus allows the dual accelerator pedals to individually and separately control the carburetor, and my apparatus also renders one of the pedals inoperative when the other pedal is in operation.

It will be seen that my apparatus provides a measure of safety for an automobile which is equipped with dual accelerators. This is done by rendering one of the pedals inoperative when the other one is depressed. If one of the pedals is in operation and the other is accidentally depressed, it will have no effect on the operation of the engine, and the driver of the automobile will retain full control over its operation.

It will, of course, be understood that various changes may be made in the form, details, arrangement and proportions of the parts without departing from the scope of my invention.

What I claim is:

1. In the linkage mechanism interposed between dual accelerator pedals of an automobile and the throttle-opening control mechanism thereof, a pair of actuating elements adapted to be respectively connected with the accelerator pedals and cooperatively arranged for individual and separate actuation of the throttle control mechanism, and said elements being shiftable into interference with each other, so that projection of one of said elements will positively prevent projection of the other element.

2. In an automobile having throttle-opening control mechanism and dual accelerator pedals with connecting appendages extending therefrom, the combination of linkage mechanism connectable to such throttle-opening mechanism and for operating the same, a shiftable seat connected with said linkage mechanism, a pair of initially individually shiftable elements being constructed and arranged to render one of said elements inoperative when the other is in projected position, each of said elements being adapted to be connected to one of such appendages and being shiftable into operating relation with said seat, whereby when said linkage mechanism is connected to such throttle control mechanism and each of said shiftable elements is connected to the corresponding appendage and pedal, depressing one of such pedals will cause shifting of the corresponding element, which will shift said seat and linkage mechanism to operate such throttle-opening control mechanism and which will obstruct the path of shifting of said other actuating member to preclude the same from shifting into operating relation with said seat member.

3. In an automobile having throttle-opening control mechanism and dual accelerator pedals with connecting links attached thereto, the combination including a pair of slidably supported rod members being convergingly shiftable for mutual interference to preclude shifting of one of said members when the other is in shifted position, each of said rod members being adapted to be connected to one of said connecting links, and a bottom reciprocated element engaged by both of said rod members and to be actuated by either of said rod members and adapted to be connected with the throttle control mechanism for operation thereof.

4. In the linkage mechanism interposed between the throttle-opening control mechanism of an automobile and the dual accelerator pedals thereof which have connecting links attached thereto, the combination including a pair of slidably supported rod members being adapted to be respectively connected to the connecting links, each of said rod members being mounted to shift in a direction to cross the shifting path of the other of said rod members and to interfere with the shifting of the other of said rod members, a bottom reciprocated member engaged by both of said rod members to be actuated by either of the same and adapted to be connected with the linkage mechanism for operation thereof, whereby when said rod members are connected to the respective links and the reciprocated member is connected to the linkage mechanism, depressing of one of the pedals will cause shifting of the corresponding rod member, which will shift said reciprocating member and linkage mechanism to operate such throttle opening mechanism and which will obstruct the path of shifting of said other rod member to preclude the same from shifting into operating relation with said reciprocating member.

References Cited in the file of this patent

UNITED STATES PATENTS

| 1,706,906 | Bailhe | Feb. 12, 1929 |
| 2,604,962 | Tibbetts | July 29, 1952 |
| 2,610,274 | Kelleigh | Sept. 9, 1952 |

FOREIGN PATENTS

| 674,403 | Canada | June 25, 1952 |
| 1,007,550 | France | Feb. 6, 1952 |